Dec. 12, 1961 G. P. FELTS 3,012,307

PRINTED CIRCUIT CONNECTOR

Filed Oct. 8, 1956

Gordon P. Felts,

INVENTOR.

BY Robert M. McManigal

Attorney 3,012,307
Patented Dec. 12, 1961

3,012,307

PRINTED CIRCUIT CONNECTOR

Gordon P. Felts, Sierra Madre, Calif., assignor to Microdot Inc., South Pasadena, Calif., a corporation of California Filed Oct. 8, 1956, Ser. No. 614,746
2 Claims. (Cl. 29—155.55)

The present invention relates generally to cable fittings, and is more particularly concerned with miniature connectors such as utilized for insulated and shielded cables commonly known as coaxial cables.

The small size of these miniature connectors as presently utilized in present day electronic circuitry presents manufacturing problems which have a material effect upon being able to construct and assemble these connectors efficiently and economically. In other words, in fabricating the miniature connectors, it has been found that quite different techniques must be employed than those which might be employed in working with larger connectors. In fact, it has been found that as a practical matter, machining operations which would be impractical when working with larger parts, in some cases become the most economical and efficient method of production when utilized in connection with the relatively smaller parts which are used in these miniature connectors.

This has been particularly significant with respect to the fabrication of miniature connectors for use with printed circuits, and more particularly the type of printed circuit connector, wherein the connector housing which has metallic connection with the conducting shield of a coaxial cable is provided with a plurality of pin connectors which must fit into a printed circuit mounting hole pattern in which the holes are located within precisely determined distances with respect to a central conductor having connection with the conducting element of the cable.

Heretofore, it has been the customary procedure to provide the connector housing at one end with an end flange. The pins were separately fabricated and mounted on the flange by inserting one end of each pin in a drilled hole properly spaced in the flange to conform with the circuit mounting hole pattern of the printed circuit. The anchored ends of the pins were then either staked or brazed in position. It was found that this procedure was not only expensive, but that it lacked the necessary accuracy which was required to be able to mass produce pins which would accurately fit into the printed circuit hole pattern.

With the foregoing in mind, the present invention has for one object the provision of a printed circuit connector wherein the connector pins of the housing are integrally formed.

A further object resides in the provision of an improved method of fabrication, whereby the material of the housing is milled out in such a manner as to leave the integrally formed pins accurately positioned to conform to the printed circuit mounting hole pattern.

Still another object is to provide in a printed circuit connector of the angle type, an improved construction with respect to the current carrying members and the manner in which they are insulated, so that they may be operated at high potentials and have less potential leakage than in connectors heretofore provided of this type.

Further objects of the invention will be brought out in the following part of the specification, wherein detailed description is for the purpose of fully disclosing the invention without placing limitations thereon.

Referring to the accompanying drawings, which are for illustrative purposes only:

Figure 1:
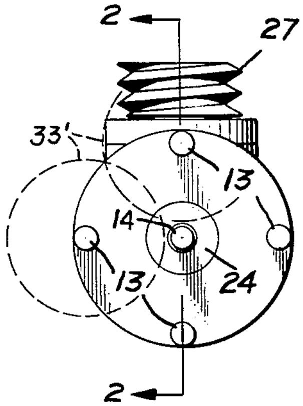
FIG. 1 is an end elevational view of a connector fitting embodying the features of the present invention, this view particularly showing the spacing of the housing pins.
Figure 2:
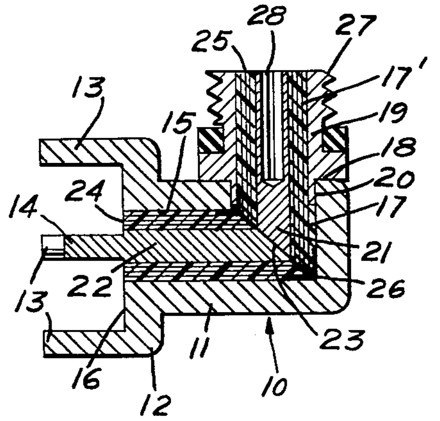
FIG. 2 is a transverse section taken through the connector fitting substantially on line 2—2 of FIG. 1.
Figures 3, 5:
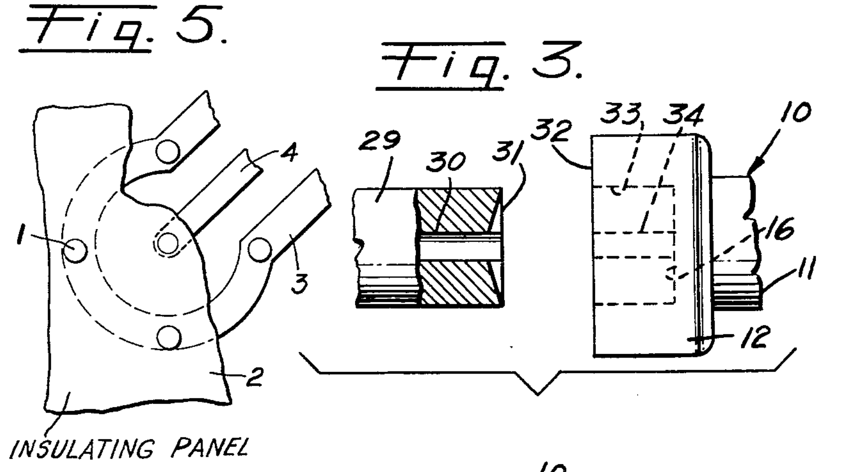
FIG. 3 is a view illustrating the initial step utilized in the method for forming the connector pins on the housing, wherein the housing is first formed with a head portion.
FIG. 5 is a fragmentary view of a printed circuit grid mounting hole pattern of the type with which the connector fitting of the present invention may be utilized.

Referring generally now to the drawings, for illustrative purposes only, there is disclosed in FIGS. 1 and 2 a right angle connector fitting for mounting on a printed circuit panel with a plurality of housing pins cooperatively associated with the mounting holes of a printed circuit grid pattern as illustrated in FIG. 5, wherein the mounting holes are spaced within extremely close limits. As a general rule, it is the custom to provide four pins which are arranged to pass through panel holes 1 on a printed circuit panel 2 of insulation material and provide a four point anchor for the connector fitting. These pins are inserted through the mounting holes and are either upset or soldered at their projecting ends to hold them on the panel, and as a rule are dip soldered to connect them with a common thin foil conductor 3 of the printed circuit, which usually is grounded with respect to this connector housing. The central pin of the connector fitting is arranged to connect with a separate foil conductor of the printed circuits, as indicated by the numeral 4. With the pins as separately formed and staked or brazed to the housing, the mounting proved unsatisfactory in that the pins became loosened over a period of time, or caused trouble with the connection joints to the thin foil so that failures in operation more readily resulted. Also, due to the difficulty of properly spacing the separate pins and mounting them in the housing, the pins would not always fit into the pattern and consequently had to be bent and forced into position. This procedure further reduced the assurance of subsequent proper and long operation of the connector.

More specifically, the connector of the present invention overcomes these difficulties by providing an elongate housing 10 of suitable metal, this housing having a main body portion 11 of uniform diameter with a head portion 12 at one end enlarged diameter. Around its periphery, the head portion 12 is fabricated with a plurality of projecting integrally formed pins 13 which are in symmetrically spaced apart relation and outwardly spaced from a central pin 14, the pins 13 and 14 being arranged to conform with a printed circuit mounting hole grid pattern in the manner previously described.

The body portion 11 has an axially extending bore passage 15 the outer end of which opens into the end surface 16 of the head portion. Extending transversely of the body portion at the other end of the housing, there is provided a housing extension 19 which has a connecting flange 20 adapted to slip within the outer end of the bore passage 17. This flange is silver soldered to the adjacent bore surface so as to permanently secure the housing extension in mounted position projecting at right angles to the axis of the body portion 11. The housing extension 19 likewise has an axially extending bore passage 17' which provides an extension for the bore 17.

The bore passages are respectively provided with elongate conducting elements 21 and 22 which are mitred at their innermost ends and bonded in a mitred joint 23 in a manner which will hereinafter be explained. The conducting elements are insulatingly supported with respect to the housing and the housing extension by means of surrounding sleeves 24 and 25 of suitable insulating material e.g., Teflon. The innermost ends of these insulating sleeves are likewise mitred and are potted in a suitable potting compound, as indicated by the numeral 26, which prevents leakage at this joint at extremely high potentials.

The conducting element, it will be observed, has the pin 14 integrally formed at its outer end. Various types of connections, depending upon installation requirements, may be provided at the other end of the housing and to conducting element 21. In the disclosed arrangement, the housing extension 19 is externally threaded as shown at 27 to connect with a suitable connector, while the conducting element 21 is constructed, for example, to provide a pin receiving receptacle or socket 28.

Figure 4:
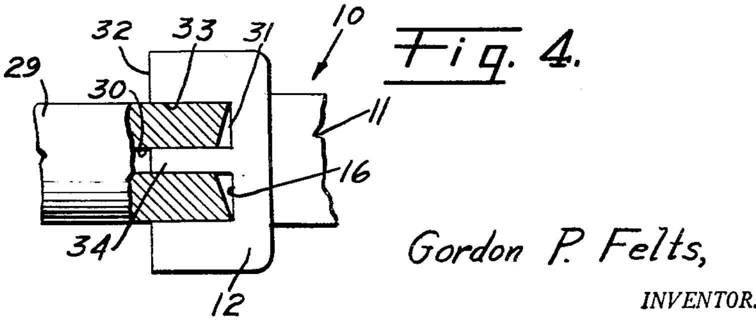
FIG. 4 illustrates a continuing method step, whereby the head material is milled away, except for the material at a pin location.

Referring to FIGS. 3 and 4, the method of fabricating the pins 13 as integral parts of the housing 10 will now be explained. The housing 10 is initially provided with a head portion 12 which is of solid material and of an axial length exceeding the finished length of the pins 13, which may be desired.

According to the method utilized herein, the material is then removed from the head, except for the pin forming portions. This is accomplished by utilizing a hollow end milling cutter, as shown at 29, this cutter being of conventional construction and having a central bore 30 of a diameter corresponding to the desired diameter of the pin which is to be formed. The working end of this milling cutter is provided with cutting teeth 31. By now pressing the teeth against the exposed end surface 32 of the head portion 12, in the proper position to form a pin at the desired pin location, rotation of the cutter will remove an annular area 33, as shown in dotted lines in FIG. 3, while leaving the portion 34, as shown in dotted lines, as an integrally formed pin. When the cutting has proceeded to the desired depth to form the surface 16 of the head, the milling cutter is removed and moved to the new pin position.

By making the milling cutter of the proper diameter, the periphery of the milling cuts will overlap as indicated by dotted lines 33' in FIG. 1 and it is only necessary to take four milling cuts in order to provide the four integrally formed pins 13, and these pins will be accurately spaced and located with the necessary precision to properly fit into a printed circuit mounting hole pattern laid out to close dimensions.

The procedure in assembling the conducting elements and insulating sleeves in the housing structure will now be described. The mitred ends of the conducting elements 21 and 22 are tinned so that they may be readily soldered. The connecting element 21 and its associated insulating sleeve 25 is first placed in its proper position as shown in FIG. 2. The conducting element 22 is then placed in position and aligned by means of a suitable temporary guide bushing (not shown). By exerting pressure against the outermost ends of the conducting elements, their mitred ends may be held in abutment under pressure and then bonded. This bonding may be accomplished in several ways. One way is to apply heat at one or both ends of the conducting elements until the solder at the tinned ends of the conducting elements is melted and bonds these ends together. Another way is to apply a suitable electric current through the conducting elements, whereby these elements will be sufficiently heated due to their inherent resistance to cause a melting of the solder at the tinned ends and a consequent bonding or soldering of the innermost ends of the conducting elements together.

The guide bushing is then removed and a potting compound placed over the inner end of the insulating sleeve 25, after which the insulating sleeve 24 is pressed into position with its inner end engaging the potting compound. This potting compound thus forms a sealed joint at the innermost ends of the insulating sleeves which has extremely high insulating properties and will prevent leakage of potential and breakdown of the insulation at extremely high values.

From the foregoing, it will be appreciated that the present invention embodies a printed circuit connector in which the connector pins are integrally formed and located with extremely high precision enabling their use with a standardized precision printed circuit mounting hole pattern, which has extremely high potential breakdown properties, and which is of a simple construction which overcomes the inherent disadvantages of previous connectors of this type.

Various modifications may suggest themselves to those skilled in the art without departing from the spirit of my invention, and, hence, I do not wish to be restricted to the specific form shown or uses mentioned, except to the extent indicated in the appended claims.

I claim:

1. A precision method of manufacturing a miniature electrical connector having a plurality of spaced, parallel connecting pins comprising: the formation of a piece of electrically conductive material having a head portion exceeding in length the longitudinal dimensions of said pins, said head portion terminating in a substantially flat working face perpendicular to the desired axis of said parallel pins, the selection on said face portion of the locations of the axis of said pins, and the removal of all head material within an annular cylindrical area surrounding each selected pin axis and spaced therefrom a distance corresponding to the desired radius of said pins, said removal to proceed inwardly of said head and axially of and rotatably about each said pin axis to a depth equal to the desired axial length of each said pin, said cumulative annular areas overlapping sufficiently to occupy the entire face portion outside of that to be occupied by said pins whereby through said removal there is formed a plurality of connecting pins integral with and extending from a common surface, the elevation of all parts of which is less than the elevation of the highest base of said pins.

2. A precision method of manufacturing a miniature electrical connector having a plurality of spaced, parallel connecting pins comprising: the formation of a piece of electrically conductive material having a head portion exceeding in length the longitudinal dimensions of said pins, said head portion terminating in a substantially flat workng face perpendicular to the desired axis of said parallel pins, the selection on said face portion of the location of a plurality of circumferentially spaced pin axes symmetric with respect to the longitudinal axis of said head portion, the removal of all head material within an annular cylindrical area surrounding each selected pin axis and spaced therefrom a distance corresponding to the desired radius of said pins, said removal to proceed inwardly of said head and axially of and rotatably about each said pin axis to a depth equal to the desired axial length of each said pin, and said annular areas being substantially equal in cross section and overlapping sufficiently to occupy the entire face portion outside of that occupied by said pins whereby through said removal there is formed a plurality of connecting pins integral with and extending from a common surface, the elevation of all parts of which is less than the elevation of the highest base of said pins.

References Cited in the file of this patent

UNITED STATES PATENTS

| | | |
|---|---|---|
| 376,014 | Rex | Jan. 3, 1888 |
| 1,584,524 | Fisher | May 11, 1926 |
| 1,977,194 | Malkovsky | Oct. 16, 1934 |
| 2,188,631 | Kraus | Jan. 30, 1940 |
| 2,335,041 | Bruno | Nov. 23, 1943 |
| 2,354,653 | Allen | Aug. 1, 1944 |
| 2,822,608 | Watson | Feb. 11, 1958 |

FOREIGN PATENTS

| | | |
|---|---|---|
| 749,696 | Germany | Nov. 29, 1944 |